United States Patent [19]

Stahl

[11] Patent Number: 5,466,489
[45] Date of Patent: Nov. 14, 1995

[54] ENVIRONMENTAL NON-TOXIC ENCASEMENT SYSTEMS FOR COVERING IN-PLACE ASBESTOS AND LEAD PAINT

[76] Inventor: Joel S. Stahl, 530 E. Central Blvd. Suite 1504, Orlando, Fla. 32801

[21] Appl. No.: 64,548

[22] Filed: May 19, 1993

[51] Int. Cl.⁶ .................................................. B05D 1/02
[52] U.S. Cl. ...................... 427/421; 427/222; 427/393.5; 427/393.6; 588/254
[58] Field of Search ........................ 427/393.6, 421, 427/222, 393.5; 588/254

[56] References Cited

U.S. PATENT DOCUMENTS

| | | | |
|---|---|---|---|
| 4,122,203 | 10/1978 | Stahl | 428/309 |
| 5,034,075 | 7/1991 | McMath | 427/359 |
| 5,229,437 | 7/1993 | Knight | 427/207.1 |

Primary Examiner—Michael Lusignan
Assistant Examiner—David M. Maiorana
Attorney, Agent, or Firm—Renner, Otto, Boisselle, & Sklar

[57] ABSTRACT

A method of coating a substrate, for example, to abate asbestos or lead paint by encasement, includes dispersing particulate solids in at least one liquid thermosetting resin, about 100% of said solids having a U.S. Standard mesh size of about 225 mesh or smaller and at least about 10% of said solids having a U.S. Standard mesh size of about 325 mesh or smaller; dispersing an effective amount of at least one catalyst in said resin to cure said resin within a determined period of time, the resulting mixture being a curable resin system; and spraying said curable resin system on to said substrate using an airless spray system. A product made by such method and an article comprised of such a coating.

25 Claims, 1 Drawing Sheet

5,466,489

ENVIRONMENTAL NON-TOXIC ENCASEMENT SYSTEMS FOR COVERING IN-PLACE ASBESTOS AND LEAD PAINT

TECHNICAL FIELD

The present invention relates generally, as is indicated, to environmental nontoxic encasement systems for covering in-place asbestos and lead paint, and, more particularly, to such environmental encasemerit that is fire resistant.

BACKGROUND

Environmental encasement systems for covering in-place asbestos and lead paint for asbestos abatement and lead paint abatement offer an effective economical means to solve an environmental problem of enormous proportions today. The removal of asbestos from existing installations has not proved satisfactory because of excessive high costs, the requirement to vacate the premises, and the placing of airborne particles that are carcinogenic and otherwise may present a substantial health hazard. Removing millions of tons of asbestos from public and commercial buildings, industrial plants and residential dwellings is an expensive, complicated and, to an extent, hazardous solution. Another problem is the limited number and size of toxic waste sites in the country for disposing of the asbestos.

In the "Green Book" entitled *Managing Asbestos In Place*, published July, 1990, by the Environmental Protection Agency, the authors discuss response actions for asbestos abatement. Such response actions include encapsulation (covering the asbestos containing materials (ACM) with a sealant to prevent fiber release), enclosure (placing an airtight barrier around the ACM), encasement (covering the ACM with a hard-setting sealing material), and repair or removal of the ACM. In general, encapsulation, enclosure, encasement, and repair are intended to help to prevent the release of asbestos fibers, and the authors recommend assessing as viable alternatives to removal, the processes of encapsulation, encasement, enclosure or repair.

The removal of lead paint also causes hazardous conditions, especially when the lead paint is scraped or sanded, whether inside or outside a building. There is no satisfactory solution currently known for removing lead paint. Fine dust is formed when lead paint is scraped and sanded, and that dust tends to contaminate the air and is especially harmful to children and to elderly people. The covering of lead paint with a hard shell to encase the lead paint offers a viable solution to lead paint abatement.

A commercial material previously used as a fire protective thermal barrier for foam plastics is sold under the U.S. registered trademark Staytex®. Such material and methods of using such material are disclosed in U.S. Pat. No. 4,122,203, the entire disclosure of which is hereby incorporated by reference. Such material is well accepted as meeting building codes, fire codes, etc. For example, the New York City MEA 52-87-M report indicates acceptability for interior finish usage with Class A flame spread rating and smoke developed rating per US Testing No. 94130 (Feb. 6, 1987). Also, the Toxicity Laboratory of the University of Pittsburgh report dated Jan. 15, 1987 provides a similar indication for the Staytex material when installed over noncombustible substrates. Exposure to fire does not produce products of decomposition or combustion that are more toxic than those given off by wood or paper when decomposing or burning under comparable conditions.

As is disclosed in such patent, a thermal barrier that provides fire resistance is comprised of a continuous phase of a flowable or sprayable synthetic resinous material in which is substantially uniformly dispersed an inorganic salt of a Group II A element of the Periodic Table selected from the group consisting of magnesium, wherein the salt has an excess of 35% by weight of chemically bound water of crystallization, a major portion, and preferably essentially all, of which is driven off when the salt is heated to a temperature from about 200° F. but below about 600° F. The preferred salt disclosed in such patent is magnesium sulfate heptahydrate ($MgSO_4 \cdot 7H_2O$), economically available as epsom salts. Such material contains a high level of water of crystallization, most of which is given up at about 392° F., and the crystals smaller than about 20 U.S. Standard mesh (840 microns) provide the multiple functions of resin extender, fire resistance provider, and flame retardant in the thermal-barrier formed thereof. Many of the features of the Staytex material described in such patent inure to the instant invention.

One drawback to the original Staytex material disclosed in the above patent is the relatively large size of the particles of the salt used. As is described in the examples in that patent, to pump the resin containing the salt crystal particles, e.g., for spraying, the particle size of the crystals was such that all of the crystals had to go through a 20 U.S. Standard mesh screen. The preferred size range is described as from about 20 mesh (0.84 millimeters) to about 200 mesh (74 microns); and as is especially described in that patent, it was essential that the crystals be in a size range smaller than about 10 mesh and larger than those which would go through a 325 mesh screen.

A disadvantage to using relatively large size particles is the inability to spray the resin and salt material by an airless spray system and the difficulties attendant an air spray process. Therefore, often it was the case that the material had to be applied by use of a trowel onto a surface. Such process is messy and usually requires the material to be applied in a special plant or factory, not on a job site in situ. This limitation is contrary to the requirements for on-site application for encasing asbestos and lead paint.

Also, to avoid running, especially when the coating material is applied to a vertical surface, it often is necessary to use a thixotropic agent, such as Cabosil. A drawback to using a thixotropic agent, though, is that it raises the viscosity of the material causing difficulty, and sometimes impossibility, of pumping the material.

When the material was sprayed onto a substrate, air spray equipment was required. A substantial styrene odor would occur during the curing of the material. The air involved in the spray process would tend to distribute the odor over a wide area, and the odor would tend to permeate not only the local job site but also elsewhere in the building in which the material is being applied. The styrene odor sometimes tends to cause nausea, dizziness, and/or other unpleasant manifestations. It has been found that screening the work area by plastic walls, such as using polyethylene sheeting, has been unsatisfactory to date to contain such odors. Also, negative pressure has been unsatisfactory to date to prevent penetrating styrene odors from permeating the external environment, even though negative pressure has been used to prevent release of asbestos particles, for example. Ordinary charcoal and other types of filters also have not been effective to date to eliminate the styrene odor.

Another disadvantage with the air spray process of applying Staytex material is the relative lack of accurate control of the spray stream, which tends to cause unintended areas to be sprayed, thus requiring cleanup and also sometimes resulting in non-uniform coatings. Further, air spray equipment uses air pressure to bring the catalyst into the resin; a drop in air pressure causes a lesser amount of catalyst, possibly resulting in an incorrect amount, e.g., too little, of catalyst being supplied to the resin and, thus, inadequate or incomplete curing.

Still a further disadvantage with air spraying processes is the need to bring all of the equipment, including the supply of Staytex coating material and catalyst, into relatively close proximity to the material being spray coated. This requires substantial labor both to move the equipment to the location, to remove the equipment, and to cleanup the mess often associated with relatively heavy equipment and industrial processes.

Another problem encountered in air spray processes of applying the Staytex material has been the curing of the material in flow-lines. Typically the resin with the salt and a promoter are placed in one tank or container and the catalyst in another; the catalyst is mixed with the primary material, which is sprayed. Once the catalyst starts working with the promoter, curing begins, and it is possible that the material can cure in the flow lines if the system is shut down for too long a period. This requires substantial cleaning of the spray equipment.

Another problem with air spraying the Staytex material relates to the fact that in high humidity areas or where there is water splash on the cured material, granules of the epsom salt exposed at the surface to such moisture may expand, e.g., as in effervescence, and the water molecules may release tending to degrade the surface of the material and also possibly to degrade the fire retarding nature of the material. In the past it sometimes was necessary to apply an additional gel-coat of pure polyester resin, for example, to provide a resin rich surface to assure full enclosing of the salt.

SUMMARY

According to an aspect of the invention, a method of encasing a substrate includes spraying a fire retarding encasing material onto a substrate, the spraying including using an airless spray process.

According to another aspect of the invention, a method of applying a fire retarding material to a substrate includes selecting a fire retarding material including a mixture of a resinous material and a finely divided salt, at least 10% of which is 325 mesh or smaller in size, and spraying the material by an airless spray process.

According to another aspect of the invention, a method of applying a fire retarding material to a substrate includes selecting a fire retarding material including a mixture of a resinous material and a finely divided salt, at least from about 10% to about 80% of which is 325 mesh or smaller in size, and spraying the material by an airless spray process.

According to an additional aspect, a fire retardant thermal-barrier material includes a synthetic resinous material, and dispersed in the resinous material is a finely divided, crystalline, hydrated salt, at least about 10% of which is 325 mesh or smaller in size.

A further aspect of the invention relates to a method of coating a substrate with a synthetic resinous styrene containing material while minimizing styrene odor emission, including spraying the substrate with the material using an airless spray system, and supplying the airless spray system with such material including salt at least about 10% of which is 325 mesh or smaller.

Still according to another aspect of the invention, a method of abating asbestos or lead paint in situ includes spraying onto the asbestos or lead paint a synthetic resinous material containing finely divided particles of salt, and supplying the resinous material with salt at least about 10% of which is 325 mesh or smaller.

According to still an additional aspect, a fire-protective insulating laminate includes a substrate and bonded thereto a thermal-barrier formed of a cured thermal setting synthetic resinous material having dispersed therein an effective amount of a finely divided, crystalline, hydrated inorganic salt extender sufficient to provide a predetermined level of fire resistance as determined specifically by a testing procedure designated ASTM E-119-76, or other fire resistance testing procedures, the hydrated extender being characterized by having at least 35% by weight water of crystallization, the major portion of which is released upon heating to a temperature in the range from about 200° F. but below 600° F., and wherein at least about 10% of the hydrated extender is 325 mesh or smaller in size.

According to yet another aspect, a spraying or flowing method for forming a fire protective laminate formed of a substrate, and, bonded thereto, a thermal barrier formed of a mixture of liquid thermal setting synthetic resin and inorganic material dispersed therein, includes (a) admixing into the liquid resin from about 30 parts to about 80 parts by weight per 100 parts of combined continuous phase and hydrated salt extender a hydrated inorganic salt extender consisting essentially of a hydrated salt of a Group II A element, at least about 10% of the hydrated salt being present in the size range from about 325 U.S. Standard mesh or smaller, (b) providing the liquid resin sufficient catalyst to provide cured resin in a predetermined period of time, and (c) bonding the resin to a substrate to form the laminate so as to provide the laminate with fire resistant properties sufficient to meet the requirements as determined by a testing procedure designated ASTM E-119-76 or other fire resistance testing procedures.

While using the finer ground or pulverized salt of the present invention, complete covering of the salt by the resin is obtained so that there is a resin rich surface, and top coating ordinarily no longer would be necessary. The resulting surface is aesthetically better looking and does not have the past problems.

These and other objects, features, aspects and advantages of the present invention will become more apparent as the following description proceeds.

To the accomplishment of the foregoing and related ends, the invention, then, comprises the features hereinafter fully described, and particularly pointed out in the claims. The following description and the annexed drawing setting forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications and is limited only by the scope of the claims.

DESCRIPTION

Figure 2:
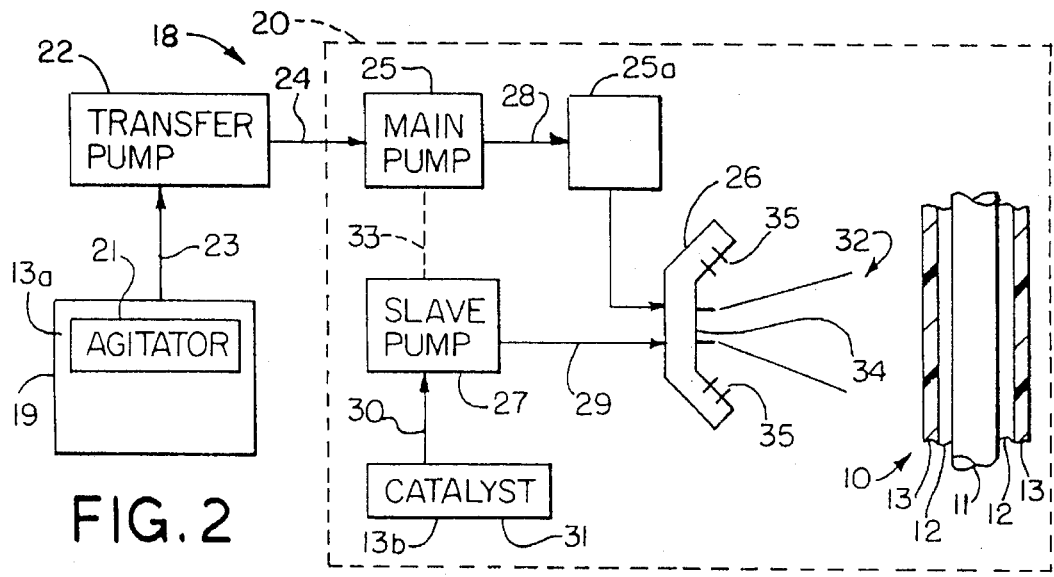
FIG. 2 is a schematic illustration of equipment for carrying out the process of the invention using airless spray apparatus with some of the equipment and the main supply of material located outside a building in which coating process is carried out.

The present invention relates to environmental non-toxic encasement to cover asbestos, lead paint or other materials, especially those which require abatement. Encasement avoids the release of asbestos particles and lead dust and eliminates disposal problems. A coating material provides encasement and/or other coating functions for a substrate. The coating material of the invention may be used on floors, walls, pipes, pipe chases, elevator shafts, ceilings, roofs, vessels, tanks, etc., both externally and internally of a building or other structure.

The chemical formulation of the material used with the invention is similar to or may be substantially the same as the chemical formulation of a well approved commercially used material sold under the trademark Staytex as also is disclosed in U.S. Pat. No. 4,122,203. The characteristics of Staytex material, such as excellent flame retarding and fire-protective features also are included in the present invention.

As was mentioned above, the Staytex material is very well approved by appropriate building inspection, code and regulating organizations and laboratories. The Staytex material is especially useful as acoustical finish and encasement material. It reduces sound transmission. It can be used to encase cement block, gypsum wallboard, fiberglass and mineral fiber insulation, metallic surfaces, and asbestos.

The present invention, more specifically, relates to improvements in the coating material, in the process for applying the coating material, and in the resulting product. An improvement in the coating material, which includes a synthetic resinous material and a finely divided crystalline, hydrated inorganic salt, is the selecting of the salt to be of a particulate size such that at least about 10% of the salt is 325 U.S. Standard mesh or smaller. More preferably, about 100% of the salt also meets the requirement of being at least 225 U.S. Standard mesh or smaller. Such coating material, then, is applied to the surface of a substrate intended to be coated or encased by using an airless spray apparatus. Since the spray apparatus is airless, close control of spray pattern is possible, indeed closer than that ordinarily obtainable using an air spray process.

Penetrating styrene odor is reduced by using an airless spray process as compared to the use of an air spray process. Since air is not used, the sprayed material is not dispersed into a mist that would facilitate styrene odor entering the surrounding environment. Also, using an airless spray system in which the coating material is sprayed under pressure provided by a main pump and an accurately controlled amount of catalyst is added using a slave pump coordinated with the main pump, complete and effective curing in a relatively minimum amount of time is obtained, thus minimizing the amount of styrene odor permeating the environment before curing has been completed. Still further, using the airless spray equipment and process to spray the material according to the present invention, faster application rates to coat the substrate are possible than was possible using prior air spray and manual (troweling) techniques; therefore, a coating/encasing job can be finished rapidly, which reduces the time during which styrene odor might be present in the premises.

To encase asbestos, lead paint or the like in situ, it is necessary to minimize styrene odors and effects that would require personnel who usually occupy the premises to vacate the premises. Reducing styrene odor according to the invention contributes to the ability to encase in situ. Accurately controlled catalyst delivery to the resin for fast and effective curing of the resin and increased throughput capacity of the airless spray equipment further contribute to the ability to encase the undesirable materials (asbestos, lead paint, etc.) in situ, e.g., on a job site directly in or at a building without requiring removal of such undesirable material.

According to the present invention, a material is sprayed onto a substrate. The substrate may be a flat wall, a curved pipe, or some other substrate. The substrate may include a covering material, such as asbestos or lead paint. The invention may be used to coat such covering thereby to encase the covering material. Encasement may include direct covering part or all of a flat wall, curved wall, pipe, or other surface and it also may include total encasement circumscribing a wall, pipe, pipe covered with asbestos or lead paint, etc. Thus the invention may be used to provide a coating, preferably to encase various substrates regardless of the type of object, device, surface, etc. of which the substrate is a part or which is constituted by the substrate. While the invention is especially useful to encase undesirable materials, such as asbestos and lead paint, the invention may be used also to coat other materials to provide fire protective functions and other functions, such as those described in U.S. Pat. No. 4,122,203.

Using the invention, a coated substrate will meet building code requirements as determined by testing procedure ASTM E-119-76, and other fire resistance tests, and particularly the "15-minute finish rating". In the E-119-76 test procedure, a panel is exposed to a controlled temperature gradient starting at room temperature, going to 1000° F. in five minutes, and to 1400° F. at 15 minutes. A panel passes the test when the temperature on the interface between the thermal barrier and the substrate does not exceed 325° F.

after the 15-minute exposure. In addition, the thermal barrier of the laminate must remain in place during the test. Passing the test or not depends on the effectiveness of the thermal barrier. The invention may be used for coating (including encasing) various substrates, as was mentioned above.

According to the invention, the coating material includes a resin with a hydrated particulate material, preferably salt, therein which releases its water of crystallization at from about 200° F., but at a lower temperature than 600° F. The particulate material should be fully compatible physically and chemically with the resin or other continuous phase in which it is dispersed so that the particulate material can be held uniformly distributed therein without reacting with the continuous phase. Moreover, under fire conditions the particulate material should not give off by-products which are toxic to humans.

Preferred inorganic salts which may be used as hydrated extenders include those crystalline salts of elements which have associated with them at least 35% by wt. water of crystallization, essentially all of which is driven off at a temperature below 600° F., and preferably in the range from about 200° F. to about 400° F. More preferred are the hydrated salts of Group II A elements of the Periodic Table, particularly magnesium, which are economically available, and which, upon exposure to high heat or fire, give up their water of crystallization without giving off toxic fumes. Examples of such salts are magnesium sulfate heptahydrate ($MgSO_4.7H_2O$); magnesium sulfite ($MgSO_3.6H_2O$); and magnesium monohydroorthophosphate ($MgHPO_4.7H_2O$). Most preferred is $MgSO_4.7H_2O$ which releases 70% of its water of crystallization at about 302° F. and about 85% of its water of crystallization at about 392° F.

The particulate matter included in the continuous phase preferably serves as an extender. The particulate matter, also referred to as extender or as salt herein, according to the invention, must be in finely divided crystalline form in a size range such that at least about 10% thereof is in the size range of 325 U.S. Standard mesh or smaller particle size and such that about 100% thereof is in the size range of about 225 U.S. Standard mesh or smaller. Preferably from about 10% to about 80% of the particles are 325 mesh or smaller in particle size. The amount of hydrated extender used is not critical but depends upon the thickness of the coating material, the amount of water in the extender, and the precise degree of fire protection to be imparted in a laminate construction formed therewith. Useful amounts of hydrated extender range from about 30 pans by weight to about 80 parts by weight per 100 parts of combined continuous phase and hydrated extender, a preferred range being from about 50 parts to about 60 parts by weight. It will be evident that it is desirable to use as much hydrated extender and as little resin in the continuous phase as possible, without sacrificing the fire protection of the coated substrate or the handling properties of the coating material before it is cured.

A preferred thickness of thermal barrier is in the range from about 0.0625 in. to about 0.25 in., and typically about 0.125 in. is used. The particular polymeric material chosen for the continuous phase is not critical provided it is compatible with the hydrated extender to be dispersed in it and the particular surface to which it is to be applied. Preferred polymeric materials are synthetic resinous materials such as the polyesters, polyurethanes, and thermosetting polyacrylates, various urea-formaldehyde resins, epoxy resins, and the like. Most preferred are the flexible thermosetting polyester resins which have good corrosion resistance and good outdoor weathering properties.

Where a polyester, or other catalyzable resin is used as the continuous phase, the level of catalyst, promoter and other modifiers may be varied to provide a preselected curing cycle from as little as about 30 seconds to many hours. With a polyester, a peroxide catalyst such as methyl ethyl ketone peroxide or benzoyl peroxide is used in concentrations from about 0.75% to about 3%; optionally, a cobalt organometallic promotor is used in the range from about 0.05% to about 0.7%. For speedy curing the thermal barrier coating may be heated to a temperature in the range from about 90° F. to about 150° F.

In addition to the inorganic salt hydrated extender used in the continuous phase, additional additives may be incorporated, for example, additional extenders, or fillers, such as those disclosed in Stahl U.S. Pat. No. 3,389,196. Though the hydrated extender is a filler, the term "filler" as used hereinafter in this specification, for clarity, is used to refer to inorganic materials which have no chemically bound moisture which is heat releasable. Preferred fillers are siliceous materials such as finely divided silica and/or cementitious materials such as Portland cement. The amount of these fillers used is not critical provided the amount does not adversely affect the curing, bonding and fire protective properties of the thermal barrier. In many instances no such fillers are used, but in others, up to about 15% by weight of the thermal barrier may be provided by one or more fillers. Presence of these fillers in the thermal barrier usually enhances the density and hardness of the cured thermal barrier and assists in the processability of the uncured material.

To improve the flow properties of the above-mentioned prior Staytex coating material, such as that sold under the designation Staytex 4119A coating material (U.S. Pat. No. 4,122,203) and to increase its adherence, when wet, to a foam plastic, thixotropic agents such as fumed silica and/or commercially available Cabosil or Aerosil, were added in an amount so that the total hydrated extender and fillers range up to about 70% by weight of the thermal barrier mixture. In the prior Staytex material addition of a viscosity reducer, such as triethyl phosphate (TEP) or styrene monomer, to the continuous phase resin also improves flowability and helps a small but desirable amount of resin to rise to the surface upon curing. A thin top coat also referred to as a gel coat, may be sprayed onto the resin at the conclusion of the application to ensure a surface seal, if needed.

Since the coating material of the present invention is intended to be pumped for spraying using an airless spray system employing a positive displacement pump, it is desirable that some styrene monomer be included in the continuous phase resin to improve flowability. The styrene monomer also may improve other characteristics of the resin. Cabosil, fumed silica, or thixotropic agents are not required, though, because the finer particle size of the hydrated salt extender that was heretofore used, provides adequate viscosity characteristics so the sprayed coating material does not run when applied to a substrate.

The coating material preferably is applied to the substrate, e.g., directly to asbestos or lead paint, to a wall, pipe, etc., to a foam plastic board or a gypsum board, etc., using an airless spray process.

The present invention uses particles of hydrated extender which are very fine (small) in size. Therefore, airless spray equipment can be used to apply the coating material to a substrate. Also, use of finer particles results in a smoother, more integral, resin rich surface on the coating material after it has cured. Since the surface is resin rich and strongly integral, there is less likelihood of breakage or spalling that would lead to the release of the encased material, such as asbestos or lead paint. The use of airless spray methods and equipment provides better control of the spray pattern when the coating material is applied to the substrate; this results in reduced misting that would tend to produce styrene odor and also minimizes clean-up. Airless spray techniques provide for higher throughput of material and, faster coating of the substrate than ordinarily is possible using hand troweling and air spray techniques. Further, the airless spray method and equipment used according to the invention provide for optimized curing of the coating material because of the assurance that a proper amount of catalyst is used.

The coating material can be applied on site, e.g., in situ, with minimum "down time" of the area where the material is being applied, when usual occupants of the premises must vacate the premises due to the process being carried out and/or the existence of styrene odor. Using airless spray equipment minimizes odors because there is no air to carry the odors, proper amount of catalyst is used to assure complete and effective curing in a minimum amount of time (this as a function of temperature of the local environment), and the large throughput capability of the equipment and process reduces the amount of time to complete a job relative to the amount of time required using prior application techniques. Using positive catalyst injection by a slave pump coupled to the main pump of the spray equipment so that the catalyst is injected into the spray material at the outlet of the spray gun facilitates leaving some of the equipment, including the supply of coating material, outside the premises. The coating material can be pumped from storage to the area where spraying is carried out. Labor thus is reduced; disruption and mess in the local environment where spraying is carried out also are reduced as a result. Further, since there is positive catalyst injection, the correct amount of catalyst always is injected so that complete and proper cure of the spray material is obtained; ordinarily the material is able to cure overnight, and usually at least within 24 hours.

The coating of the invention provides secure encasement that is substantially impervious to external contaminant, water, and to the encased material. The external surface of the coating is resin rich, and, therefore, ordinarily is not subject to damage due to humidity or water splash. The use of very fine particles in the resin assures full coating of the particles by the resin material and also facilitates flowing of the resin to the surface to provide such resin rich area of the coating upon curing. Thus, ordinarily a separate gel coat or top coat is unnecessary. However, if desired, for example, in the case where the coating is exposed to very high humidity, frequent water splashing or other moisture source, and/or abrasion, an additional top coat can be provided. An exemplary top-coat is pure polyester resin.

Since the coating material after curing has a resin rich surface and prevents water from permeating, protection from moisture is provided the underlying substrate. Due to the fire retarding or fire-protective characteristic of the coating material, the material will tend to hold up maintaining its integrity in the presence of fire, for example according to the test requirements of ASTM E-119-76, and both prevents release of the encased material and retards combustion of the underlying substrate.

Summarizing a number of the features and benefits of the invention, the coating is fire resistant. Adhesion to suitable substrates assures a tenacious bond. The material complies with building code requirements, and it provides a hard and durable tough protective surface over the coated substrate. Damage repair is easy; additional material can be sprayed or troweled over damaged area. Moisture barrier characteristics limit moisture transfer ordinarily without primers or top coats being needed. The cured material is light weight, for example, a 1/16-inch thickness weighing less than about 1/2 pound per square foot. Minimal odor is produced during application and cure because of accurate control of spray pattern, accurate amount of catalyst used, no use of air assist, and faster application rate so the job can be completed relatively fast; therefore, the coating can be applied in existing structures at night or on weekends so that the material will cure before the usual building occupants return. Labor, time and cost are reduced.

The coating material is formed of a combination of a continuous phase, such as a liquid synthetic resinous material, in which a hydrated inorganic salt extender is included, and such extender is in particulate form such that a substantial portion thereof, at least about 10%, is 325 mesh or smaller, for example, from at least about 10% to about 80% is the 325 mesh particle size or smaller; and about 100% is 225 mesh or smaller. The coating material is applied using airless pump and spray techniques to provide high capacity application rate, to reduce odors, and to assure provision of a proper amount of catalyst. The catalyst is added at the spray head or spray gun outlet so that the material does not cure in the flow lines.

Since, desirably, the thermal barrier comprises a polymeric resinous material as the continuous phase which, by itself, has poor fire resistance properties, it is desirable that the thermal barrier include an inorganic additive (not shown in FIG. 1) dispersed therein when it is desired to provide the requisite fire resistance. The continuous phase is preferably a thermosetting resin, and most preferably a flowable polyester or epoxy resin, optionally reinforced with inorganic fibrous and particulate materials. As is known, epoxy resins are ether polymers usually containing p-phenylene groups as well as alcoholic OH groups; and, polyester resins consist essentially of the reaction product of a dibasic acid and dihydric alcohol dissolved in a polymerizable monomer.

The cured coating material is 100% solids, there are no solvents and there is no free water. For usual encasement the cured coating material does not include glass fibers, but glass fibers can be incorporated in conventional ways to provide structural reinforcement if desired. Cure time usually can be adjusted from a few minutes under factory conditions, for example, at elevated temperatures, to 24 hours at the job site under ordinary room ambient temperatures.

The cured material has excellent capability of preventing water vapor transmission and, thus, is an excellent water vapor barrier. Permeability rating is, for example, 0.012 perm-inches at 100% relative humidity and 100° F. Thus, ordinarily a separate vapor barrier is not needed for those materials on which the material of the invention is coated.

The coating material of the invention preferably is an isophthalic polyester resin and epsom salt mixed therein. The material is non-toxic when cured and has been approved as a chemical coating for application to surfaces where there is a possibility of incidental contact with meat or poultry food product prepared as approved by USDA. The coating material has excellent adhesion characteristics. Polyester resin is a natural adhesive and will adhere well to most surfaces. If a substrate may be precoated with an acrylic or styrene-butadiene rubber adhesive for better adhesion.

An exemplary catalyst used to enable the resin to cure is methylethylketone peroxide. To promote operation of the catalyst one or more promoters may be included in the resin.

An exemplary promoter is cobalt octoate, and another promoter is dimethylaniline. Ordinarily the more promoter used, the faster the curing, and ordinarily the use of two promoters results in faster curing than when only one promoter is used. If only one promoter is used, then the cobalt octoate is preferred.

The coating material can be applied to many different substrates. Examples include encasing hazardous materials, such as asbestos and lead paint. Other examples include providing flame retardant or fire preventive characteristics to plywood, oriented strand board, foam materials such as foam board, roof sheathing, and roof trusses. The coating material also can serve as an adhesive to hold roof sheathing to roof trusses, and, as was mentioned earlier, the material can be combined with fiberglass to provide structural support characteristics.

An example of crystallized inorganic hydrated salt extender useful in the invention has a consistency similar to that of powdered sugar. Such material is well pulverized. Such material has a minimum amount of $MgSO_4$ of about 48.3%; and of that material, as a minimum about 99% contains 7 molecules of water of crystallization, i.e., $MgSO_4.7H_2O$. The material also may include up to a maximum of about 0.19 magnesium oxide (MgO) and up to a maximum of about 0.03 chlorides (as chlorine). The size characteristics of the particulate material are such that from about 10% to about 80% passes a 325 mesh filter screen and about 100% passes a 225 mesh filter screen. Typical bulk density of the particulate material so constituted and having such size characteristics is approximately 65 pounds per cubic foot.

A machine useful to pulverize the above-described hydrated salt extender is the number 44 Mikro-Pulverizer sold by Pulverizing Machinery, Division of MikroPul, United States Filter Corporation, Summit, N.J. To separate particles according to size, a Mikron-Separator also by Pulverizing Machinery can be used.

Figure 1:
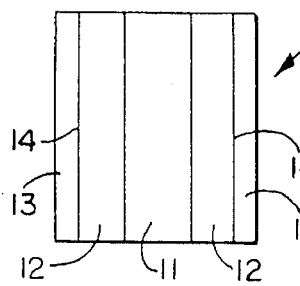
FIG. 1 is a schematic illustration of a coating according to the present invention used to encase asbestos that is surrounding a pipe.

Referring, now, to the drawings, wherein like parts are designated by like reference numerals in the several figures, and initially to FIG. 1, an encased asbestos covered pipe is shown at 10. The pipe 11 may be any pipe used to carry a fluid, and the pipe is covered by a layer of asbestos 12. To maintain the integrity of the asbestos, to avoid damage to the asbestos, to avoid release of asbestos particles to the surrounding environment, and generally to provide abatement without the need to remove the asbestos, a coating 13 according to the present invention is provided over the asbestos. The coating 13 preferably fully encases the asbestos. The coating 13 has the various characteristics and advantages described elsewhere herein. For example, the coating 13 preferably is substantially moisture-impermeable and fireresistant. The coating 13 is formed of a synthetic resinous material forming a continuous phase that contains the described fine particle hydrated inorganic salt extender; and such material has been applied directly to the surface of the asbestos 12 using airless spray equipment described further below. The coating 13 adheres relatively tenaciously to the asbestos 13 at the interface 14.

It will be appreciated that the coating 13 may be applied to many different substrates. The term substrate is used herein generically to mean anything to which the coating 13 is applied; the actual substrate material may or may not be covered by asbestos, lead paint or other material that is intended to be coated. Therefore, when reference is made to a substrate being coated by material 13, for example, such reference includes the possibility that the substrate is first covered or not by another material, such as the asbestos, lead paint, etc. Also, it will be appreciated that the reference herein to a coating 13 includes the possibility that the coating is applied to one entire surface or face of the substrate, is applied only to a portion of the surface or face of the substrate, is applied to more than one surface or face of the substrate, encases part or all of the substrate, fully or partly encloses the substrate on one side or surface, on all sides or surfaces, or on some sides or surfaces, etc.

Turning to FIG. 2, the airless spray equipment 18 and application process for applying the coating 13 to the asbestos 12 covered pipe 11 are illustrated schematically. The resin and salt extender mix 13a is contained in a large tank or vessel 19, which preferably is located outside the building 20 in which the asbestos covered pipe 11 is located. An agitator 21 agitates and mixes the material 13a in the container 19, such as a 55-gallon drum or other container or vessel. An exemplary agitator is sold by Magnum Industries of Clearwater, Fla., under the model number M-AGD-10. The airless spray equipment 18 also includes located outside the building 20 a transfer pump 22, which pumps material 13a through one or more hoses, pipes, flow lines, etc., 23, 24 into the building for spraying on the job site located in the building 20 to encase the asbestos 12 in situ. Preferably a minimum amount of the airless spray equipment 18 is located in the building 20 to minimize labor for transporting and setting up the equipment and to minimize the space required for such equipment. That equipment located outside the building 20 may be contained in a truck or other vehicle. Alternatively, the equipment outside the building 20 may be placed at a convenient location.

The balance of the airless spray equipment 18, which is located in the building 20, includes an airless main pump 25, a surge chamber 25a, a spray gun or spray head 26, a slave pump 27, and various hoses, pipes, flow lines, etc. 28, 29 and 30. The hose 30 is coupled to a container 31 in which catalyst 13b is contained. Since a relatively small amount of catalyst is required for a relatively larger amount of material 13a to form the cured coating 13, it may be convenient to locate the catalyst container 31 in the building 20 near the slave pump 27. However, if desired, the catalyst container 31 may be located outside the building. Exemplary parts for the airless spray equipment 18 are sold by Magnum Industries. For example, the transfer pump 22 may be a model AP-0500 5:1 transfer pump. The main pump 25 may be a 22:1 pump up to a 45:1 pump, which is rated at 4.6 gallons per minute, for example, Magnum Industries model MWS-CM-MS45. The spray gun 26 may be a model ATG-3500 or MG-3000-STA spray gun with dual catalyst impingement so that the catalyst 13b is mixed with the material 13a externally of the flow passages that are inside the spray gun 26, thus reducing the requirement for flushing of the spray gun. The slave pump 27 may be a model BOS-3000 catalyst slave pump unit which meters catalyst from about 0.5% to about 2.5% of the flow provided by the main pump 25 in one-tenth percent increments. The catalyst slave pump unit maintains accuracy of the catalyst flow even though the tip size of the spray gun 26 or the pressure of the main pump 25 may change. Since the catalyst is added after the material 13a exits the flow passages in the spray gun 26, the material 13a can be pumped over relatively long distances, for example, from about 75 feet to about 300 feet and possibly even longer, depending on the capability of the transfer pump 22, viscosity, and other parameters relating to flow.

The surge chamber 25a may be a Hi-Output Surge Chamber sold by Magnum Industries. The surge chamber balances or smoothes the pressure in the fluid output from the airless main pump 25 for delivery to the spray gun 26. A surge chamber also may be provided in the flow path from the slave pump to the spray gun.

In using the airless spray equipment 18 to carry out the airless spray process according to the invention, as is schematically depicted in FIG. 2, the resin-salt extender material mixture 13a is maintained in the container 19 and is constantly agitated by the agitator 21. The material 13a also may include other ingredients, as are described below in the several examples. In particular, the material 13a may include one or more promoters, such as cobalt octoate and/or dimethylaniline. The catalyst material 13b, such as methylethylketone peroxide is maintained in a separate container 31. The transfer pump 22 pumps the material 13a through the hoses 23, 24 to the main pump 25. In turn, the main pump 25 pumps the material 13a through hose 28 to the spray gun 26. Since the transfer pump 22 provides the effort to transfer the material 13a to the main pump 25, the main pump can be used primarily to provide the effort to spray the material from the spray gun 26. The material 13a then is sprayed by the various spray tips or outlets of the spray gun 26 toward the asbestos 12 covered pipe 11 to form the coating 13 thereon. The main pump 25 preferably is a positive displacement pump which delivers a relatively accurately controlled amount of material 13a to the spray gun 26 for spraying. The spray material is depicted at 32 in FIG. 2. The slave pump 27 preferably has a positive displacement pump that is tied or connected to the main pump 25, as is schematically represented at 33. Operation of the slave pump 27 is directly related, preferably directly proportional, to the operation of the main pump 25 so that the ratio of catalyst 13b to material 13a remains constant and is controllable by the user. For example, for every stroke of the main pump 25, there is a corresponding simultaneous stroke of the slave pump 27 to provide a coordinated amount of catalyst to the spray material at all times.

The spray gun 26 preferably has a primary tip or outlet (or group of them) 34 for delivering the material 13a from the hose 28 to form the spray 32. Additionally, the spray gun 26 preferably has two or more outlets or tips 35 from which the catalyst 13b is delivered and directed into the spray 32. Since the catalyst is added after the material 13a exits the outlet 34, the possibility of the material curing in the flow lines, pumps, etc., and the attendant problems associated therewith, are prevented. Since the amount of material 13a is fairly accurately controlled and since the amount of catalyst 13b added is accurately controlled relative to the amount of material 13a in the spray 32, proper curing, especially proper curing in a relatively minimum amount of time, of the spray material to form the coating 13 is obtained.

Usually the amount of catalyst is from less than about 0.5% to about 3% by volume of the material 13a. Too much or too little catalyst results in an improper cure. Improper curing results in a strong styrene odor and, thus, is avoided by the present invention.

Application of the coating 13 can be carried out with relatively minimal labor. Usually only two people are required to operate the equipment 18. The application rate is relatively fast. Since the spray 32 can be relatively closely controlled and accurately directed, since the equipment 18 is airless, the amount of over spray to areas unintended for coating is minimized. Since the spray material has good adhesion and since curing is well controlled, there is relatively little mess and little clean-up required. It has been found that a 1/16 inch thickness applied on vertical and horizontal surfaces will not drop off the substrate; this characteristic, of course, not only minimizes clean-up but also minimizes waste. Also, since the container 19 of material 13a is located outside the building, spillage and resulting odors, damage and clean-up are avoided.

Figure 3:
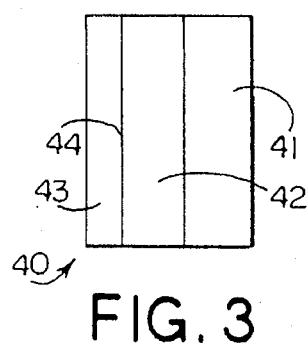
FIG. 3 is a schematic illustration of a coating according to the present invention used to encase asbestos applied to a wall surface.

Referring, now, to FIG. 3, a coated asbestos covered wall 40 is shown. The wall 41 may be formed of various materials, such as gypsum board, wood, metal, foam, brick, etc. The wall may be of a room in a building, of a pipe chase, of an elevator shaft, etc. The wall also may be an external wall of a building. The asbestos 42 covering the wall 41 may have been placed there for a variety of reasons, such as, for example, thermal insulation, resistance to fire, etc. The coating 43 preferably is the same as the coating 13 described above with reference to FIGS. 1 and 2. The coating 43 may be applied directly to the asbestos 42 forming an interface 44 therewith, as was described above with respect to the interface 14.

Figure 4:
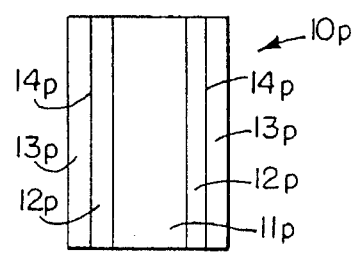
FIG. 4 is a schematic illustration of a coating according to the present invention used to encase lead paint that is surrounding a pipe.
Figure 5:
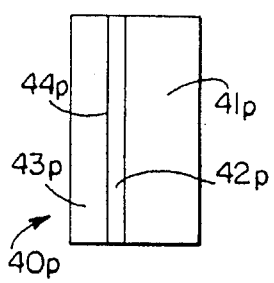
FIG. 5 is a schematic illustration of a coating according to the present invention used to encase lead paint on a wall surface.

The same reference numerals are used in referring to FIGS. 4 and 5 as were used in referring to FIGS. 1 and 3, except that the suffix "p" is added indicating that in the embodiments of FIGS. 4 and 5 reference is made to substrates covered with lead paint rather than asbestos.

An encased lead covered pipe is shown at 10p in FIG. 4. The pipe 11p may be any pipe used to carry a fluid, and the pipe is covered by a layer of lead 12p. To maintain the integrity of the lead, to avoid damage to the lead, to avoid release of lead to the surrounding environment, and generally to provide abatement without the need to remove the lead, e.g., by scraping or sanding, a coating 13p according to the present invention is provided over the lead. The coating 13p preferably fully encases the lead. The coating 13p has the various characteristics and advantages described elsewhere herein. For example, the coating 13p preferably is substantially moisture-impermeable and fire-resistant. The coating 13p is formed of a synthetic resinous material forming a continuous phase that contains the described fine particle hydrated inorganic salt extender; and such material has been applied directly to the surface of the lead 12p using airless spray equipment described further below. The coating 13p adheres relatively tenaciously to the lead 12p at the interface 14p.

Referring, now, to FIG. 5, a coated lead covered wail 40p is shown. The wail 41p may be formed of various materials, such as gypsum board, wood, metal, foam, brick, etc. The wail may be of a room in a building, of a pipe chase, of an elevator shaft, etc. The wail also may be an external wail of a building. The lead 42p covering the wail 41p may have been placed there for a variety of reasons. The coating 43p preferably is the same as the coating 13 described above with reference to FIGS. 1 and 2. The coating 43p may be applied directly to the lead 42p forming an interface 44p therewith, as was described above with respect to the interface 14.

Figure 6:
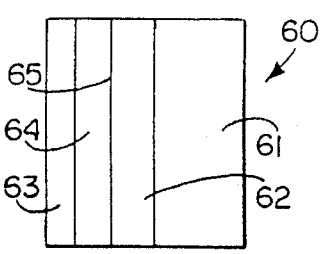
FIG. 6 is a schematic illustration of the present invention used as a coating or as part of a laminate structure on an asbestos coated or lead paint coated substrate, with additional adhesive material.

In FIG. 6 is illustrated an alternate embodiment of the invention in which a coated asbestos or lead paint covered substrate generally designated 60 is shown. The substrate 61 may be a pipe, wail, trusses of a building, roof sheathing, etc. The asbestos or lead paint 62 covers the substrate 61 or at least a portion thereof. The coating 63 is the same as the coating 13 described above with reference to FIGS. 1 and 2. However, an additional adhesive layer 64 is provided between the layers 62 and 63. The adhesive coating may be, for example, an acrylic material or a styrenebutadiene rubber, which first is applied to the surface 65 of the covering material 62 before the coating material 63 is applied to the covered substrate. The additional adhesive layer helps to secure or to bond the coating 63 to the covered substrate 61.

Figure 7:
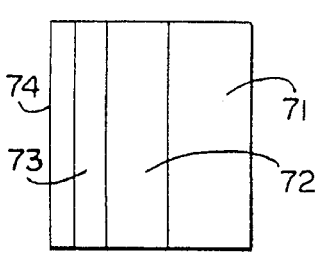
FIG. 7 is a schematic illustration of the present invention used as a coating or as part of a laminate structure on an asbestos coated or lead paint coated substrate, with a top-coat outer layer.

In FIG. 7 another alternate embodiment of the invention is illustrated where a coated covered substrate 70, formed of a substrate 71, asbestos or lead paint covering 72, and coating material 73 (such as the material 13 described above with reference to FIGS. 1 and 2) further is protected by an additional gel coat 74. The gel coat or top coat may be, for example, a material sold by Ferro Corporation under the trademark "STAYCOAT V 44057" (a polyester resin). Such a top coat prevents moisture from reaching the salts and causing effervescence. However, due to the resin rich surface formed by the material 13 upon curing, such top coat ordinarily is not required. The top coat 74 may be formed of any conventional synthetic resin, polyester, or other material that is cured and forms an external protective layer over the coating 73. The top coat layer 74 may be used for providing physical impact strength, to avoid abrasion damage, to provide moisture barrier and/or to provide other protections for the coated substrate 71.

Figure 8:
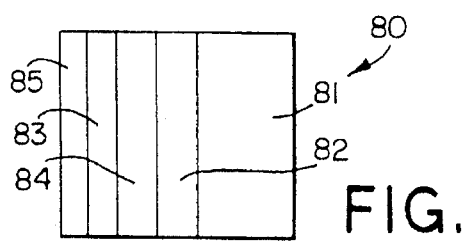
FIG. 8 is a schematic illustration of the present invention used as a coating or as part of a laminate structure on an asbestos coated or lead paint coated substrate, with additional adhesive material and also with a top-coat layer.

Briefly referring to FIG. 8, a coated covered substrate 80 is shown. The coated covered substrate 80 employs the features of the coated covered substrates 60 and 70 illustrated in FIGS. 6 and 7. Accordingly, the coated covered substrate 80 includes a substrate 81, a covering of asbestos or lead paint 82, a coating 83 (similar to the coating 13 described above with respect to FIGS. 1 and 2), an adhesive layer 84 (such as the adhesive layer 64 described above with respect to FIG. 6), and a top coat layer 85 (such as the top coat layer 74 described above with reference to FIG. 7).

The coating material 13 as well as the top coat may be colored by a variety of colors, pigments, etc. An example is titanium oxide which may be added to provide a white color.

Several examples are presented below. The first example is of the prior Staytex 4119A material referred to above.

EXAMPLE 1

The following ingredients are added in a tank or vessel in the order presented below. The ingredients are mixed well using a char or cowel mixer or equivalent to obtain substantially uniform distribution of the salt, especially, and other ingredients in the resin. The ingredients are indicated by number of pounds and percent by weight, resin 322 lbs., 27.15% (BP (British Petroleum) MI3300 resin); $TiO_2$ pigment (R-900) 8.8 lbs., 0.74% Tronox CR-822 titanium dioxide (powder pigment) by Kerr-McGee Chemical Corporation, Oklahoma City, Okla.); styrene monomer 140 lbs., 11.8% (Type 50-T, which is inhibited at 50 ppm. Dow Chemical Company); wetting Agent 2–6 lbs., 0.35% (as needed, Troykyd 98-C, by Troy Chemical Corp., Newark, N.J.); 12% cobalt octoate 1.6 lbs., 0.13% (promoter, Mooney Chemicals, Cleveland, Ohio); ⅛ inch milled fibers 12 lbs., 1% (Owens-Corning 731 DB or RCI 653-21-1250); Cabosil M-5 6–8 lbs., 0.65% (a thixotropic agent, such as that sold under the brand "Cabosil" M-5 fumed silica, by Cabot Corporation, Boston, Mass.) and epsom salts 690 lbs., 58.18% (consistency like table salt).

The salts are comprised of $MgSO_4$, minimum % 48.3; $MgSO_4$ (as $MgSO_4*7H_2O$), minimum % 99.0; MgO, maximum % 0.1; and Chlorides (as Cl), maximum % 0.03. Typical bulk density (approximately) is 65 pounds/cubic foot. Screen analysis of the salt is, as follows according to US Mesh Number: +50, 5%; −50 +200, 30%; and −200 65%.

The material has a viscosity of about 6000–8000 according to a Brookfield #4LVH testing machine.

The catalyst is mixed with the above material and the material is troweled, flowed or air sprayed onto a foam substrate. The catalyst is methylethyl ketone peroxide. For 100 gm mass, 1.0% of 9% MEK peroxide is used. The material is allowed to cure. Gel time is 8 to 14 minutes at 77 degrees F. Firm cure time is 30 to 45 minutes at 77 degrees F.

Several examples demonstrating the present invention are presented below. These examples are intended only as exemplary.

EXAMPLE 2

The ingredients by percent weight are, as follows: 27.15 (B.P. MI3300) resin; 11.25 styrene monomer; 0.16 Troy 98-C Wetting agent; 0.08 12% cobalt octoate (promoter); 0.72 $TiO_2$ (paste) R-900; and 60.6 epsom salts having a chemical composition as described above and having a consistency like powdered sugar with size characteristics such that 12% pass 325 mesh filter and 100% pass 225 mesh filter.

The same catalyst as in Example 1 is used.

The above ingredients are added in a tank or vessel in the above order. Using a char or cowel mixer or equivalent the ingredients are mixed well to obtain substantially uniform distribution of the salt, especially, and other ingredients in the resin. The material has a viscosity of about 7000 according to a Brookfield #4LVH testing machine. The material is conducted through flow lines up to about 300 feet long using an airless pump to a spray gun. At the spray gun the material is sprayed toward a surface of asbestos intended to be coated. The catalyst (MEK peroxide) is delivered into the material after the material leaves the outlet orifice of the spray gun. The material is allowed to cure in situ.

A hard impermeable coating is formed. The resin tends to form a resin rich surface area or gel coat.

EXAMPLE 3

The ingredients by percent weight is, as follows: 28.4 B.P. MI3300 resin; 0.1 DMA (promoter); 11.4 styrene monomer; 59.4 salts (epsom salts having a chemical composition as described above and having a consistency like powdered sugar with size characteristics such that 80% pass 325 mesh screen and 100% pass 225 mesh screen); 0.2 Troykoyd 98-C Wetting agent; 0.1 12% cobalt octoate (promoter); and 0.4 Cabosil thixotropic agent.

The same catalyst as in Example 2 is used. Also, the same procedure is used. The results are the same as in Example 2.

EXAMPLE 4–5

For each of these examples a tie coat of acrylic or styrene-butadiene rubber adhesive is applied to an asbestos substrate. Thereafter, each of examples 2 and 3 is respectively carried out applying the material to the tie coat. The tie coat helps to adhere the material to the surface material. The results are the same as in Examples 2 and 3.

EXAMPLES 6–9

For each of these examples each of examples 2–5 is carried out applying the material to an asbestos substrate to encase the substrate. The material adheres strongly to the asbestos substrate and encases the asbestos substrate. The results are otherwise the same as in examples 2–5. This results, the same as in Examples 2–5, in a strong impermeable encasement of the asbestos having been formed.

EXAMPLES 10–17

For each of these examples each of examples 2–9 is carried out applying the material to a substrate that has a coating of lead paint on the surface thereof. The material is applied to the lead painted surface. The material adheres strongly to the lead painted surface and encases the lead paint.

Cobalt naphthenate can be used as an alternate for the cobalt octoate identified in the above examples.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

I claim:

1. A method of coating a substrate using an airless spray system comprising an airless spray gun, the method comprising:

dispersing particulate solids comprising at least one hydrated crystalline salt in at least one liquid thermosetting resin to form a dispersion, about 100% of said solids having a U.S. Standard mesh size of about 225 mesh or smaller and at least about 80% of said solids having a U.S. Standard mesh size of about 325 mesh or smaller;

spraying said dispersion from said spray gun on to said substrate; and injecting at least one catalyst into said dispersion at the outlet of said spray gun, the amount of said catalyst being sufficient to cure said resin, and curing said resin.

2. The method of claim 1 wherein said solids are Group II A metal salts.

3. The method of claim 1 wherein said solids are magnesium salts.

4. The method of claim 1 wherein said solids are selected from the group consisting of magnesium sulfate heptahydrate, magnesium sulfite, and magnesium monohydroorthophosphate.

5. The method of claim 1 wherein said solids are characterized by having at least about 35% by weight water of crystallization, a portion of which is released upon heating to a temperature in the range from about 200° F. to about 600° F.

6. The method of claim 1 wherein said thermosetting resin is selected from the group consisting of a polyester, polyurethane, polyacrylate, epoxy and urea-formaldehyde resin.

7. The method of claim 1 wherein said catalyst is benzoyl peroxide or methyl ethyl ketone peroxide.

8. The method of claim 1 wherein said curable resin system includes a flow-improving amount of styrene monomer.

9. The method of claim 1 wherein said curable resin system includes at least one viscosity modifier and/or at least one pigment.

10. The method of claim 1 wherein said substrate comprises asbestos.

11. The method of claim 10 wherein said spraying comprises encasing said asbestos.

12. The method of claim 11 further comprising applying an adhesive between said substrate and said curable resin system.

13. The method of claim 1 wherein said substrate comprises at least one lead-containing coating material.

14. The method of claim 13 wherein said spraying comprises encasing said lead-containing coating material.

15. The method of claim 14 further comprising applying an adhesive between said substrate and said curable resin system.

16. The method of claim 1 further comprising applying an adhesive between said substrate and said curable resin system.

17. The method of claim 1 wherein said substrate is a foam plastic.

18. The method of claim 17 wherein said foam plastic is selected from the group consisting of polyurethane foam, polyisocyanurate foam, urea-formaldehyde foam, and polystyrene foam.

19. The method of claim 1 wherein said coating comprises an effective amount of said solids to provide a level of fire resistance as specifically determined by ASTM E-119-76, said solids being characterized by having at least 35% by weight water of crystallization, a portion of which is released upon heating to a temperature in the range from about 200° F. to about 600° F.

20. The method of claim 1 wherein said spraying comprises furnishing said resin through flow passages in a spray tool to a spray outlet in the spray tool, and wherein said dispersing an effective amount of at least one catalyst comprises delivering said catalyst to said resin after the resin has been emitted from said spray outlet.

21. The method of claim 1 wherein said curable resin is non-toxic to humans after curing.

22. The method of claim 1, wherein said curable resin when exposed to fire does not produce products of decomposition or combustion that are more toxic to humans than those given off by wood or paper when decomposing or burning under comparable conditions.

23. The method of claim 1 wherein said coating comprises an effective amount of said solids to provide fire resistance, said solids being characterized by having at least 35% by weight water of crystallization, a portion of which is released upon heating to a temperature in the range of from about 200° F. to about 600° F.

24. A method of encasing an asbestos or lead paint substrate using an airless spray system, comprising:

dispersing particulate solids of a Group IIA hydrated salt in at least one liquid thermosetting resin to form a dispersion, about 100% of said solids having a U.S. Standard mesh size of about 225 mesh or smaller and at least about 80% of said solids having a U.S. Standard mesh size of about 325 mesh or smaller;

pumping said dispersion through flow lines of up to about 300 feet in length to the spray gun of said airless spray system;

spraying said dispersion from said spray gun on to said substrate;

injecting at least one catalyst into said solids dispersion at the outlet of said spray gun, the amount of said catalyst being sufficient to cure said resin, and curing said resin.

25. A method of lead paint abatement, comprising:

encasing a lead paint substrate using an airless spray system, including:

dispersing particulate solids of a hydrated salt in at least one liquid thermosetting resin to form a dispersion, about 100% of said solids having a U.S. Standard mesh size of about 225 mesh or smaller and at least about 80% of said solids having a U.S. Standard mesh size of about 325 mesh or smaller;

using said airless spray system to spray said dispersion onto said substrate;

providing at least one catalyst into said solids dispersion, the amount of said catalyst being sufficient to cure said resin; and curing said resin.

* * * * *